(12) United States Patent
Baker et al.

(10) Patent No.: US 6,574,330 B1
(45) Date of Patent: Jun. 3, 2003

(54) BUS INTERFACE FOR AUTOMATIC CALL DISTRIBUTOR

(75) Inventors: Daniel F. Baker, Rolling Meadows, IL (US); Paul D. Swardstrom, Naperville, IL (US); Steven T. DeLong, Woodridge, IL (US)

(73) Assignee: Rockwell Science Center, Inc., Thousand Oaks, CA (US)

( * ) Notice: Subject to any disclaimer, the term of this patent is extended or adjusted under 35 U.S.C. 154(b) by 0 days.

(21) Appl. No.: 09/460,192

(22) Filed: Dec. 10, 1999

(51) Int. Cl.[7] ................................................ H04M 3/00
(52) U.S. Cl. ............................ 379/265.01; 379/265.02; 379/309
(58) Field of Search ....................... 379/265.01, 265.02, 379/309

(56) References Cited

U.S. PATENT DOCUMENTS

| | | | | |
|---|---|---|---|---|
| 4,040,032 A | * | 8/1977 | Kreiker | 364/200 |
| 4,480,307 A | * | 10/1984 | Budde et al. | 364/200 |
| 4,503,534 A | * | 3/1985 | Budde et al. | 364/200 |
| 4,520,451 A | * | 5/1985 | McLaughlin | 364/900 |
| 4,727,477 A | * | 2/1988 | Gavril | 364/200 |
| 5,140,611 A | | 8/1992 | Jones et al. | 375/7 |
| 5,237,567 A | * | 8/1993 | Nay et al. | 370/85.1 |
| 5,475,818 A | * | 12/1995 | Molyneaux et al. | 395/200.05 |
| 5,790,895 A | * | 8/1998 | Krontz et al. | 395/884 |

* cited by examiner

*Primary Examiner*—Creighton Smith
(74) *Attorney, Agent, or Firm*—Welsh & Katz, Ltd.

(57) ABSTRACT

An automatic call distribution system includes an automatic call distribution network, a plurality of network terminations interconnectable with the automatic call distribution network using a first bus protocol, and an interface which is interconnectable with one of the first network terminations using the first bus protocol. The interface is operable for interfacing between the first bus protocol and a second bus protocol different than the first bus protocol, and a network termination functional module is interconnectable with the interface using the second bus protocol. An automatic call distributor interconnectable with a network termination using a first bus protocol is used by a method that includes the steps of coupling a bus converter with the network termination using the first bus protocol and coupling a network termination functional module with the bus converter using a second bus protocol different than the first bus protocol. The bus converter is operable for converting between the first bus protocol and the second bus protocol.

27 Claims, 6 Drawing Sheets

BUS INTERFACE FOR AUTOMATIC CALL DISTRIBUTOR

TECHNICAL FIELD

The present invention relates generally to interfaces and, more particularly, to a bus interface that achieves bus compatibility between an automatic telephone call distributor employing a first bus protocol and a peripheral that employs a second bus protocol different than the first bus protocol of the automatic telephone call distributor.

BACKGROUND OF THE INVENTION

Automatic Call Distributor (ACD) switching systems typically are required to perform many complex tasks, and the functional requirements for such systems are continually evolving. An ACD switching system may handle many types of "calls" or "transactions" including not just conventional (voice) telephone calls but also, for example, e-mail, voice-mail, Internet transactions, voice-over-Internet-Protocol transmissions, facsimile transmissions, etc. Other tasks that ACD's must perform may include, by way of example only, the provision of answer-detection for international telephony systems, voice-mail, voice receive (capture) and transmit (play-back), voice-recognition, voice-response, DTMF-tone and other PCM-sequence detection, and other service features, and the implementation of diverse signaling systems to accommodate a variety of telephone and data communication systems (e.g., conventional analog telephone circuits, T-1 connections, voice-signaling via Internet Protocol, Digital Trunk Ports (DTP's), etc.). Of course, innumerable other tasks or functional features may be provided in an ACD, if desired.

Frequently, the functional features of an ACD system are implemented by peripheral devices or network termination functional modules that communicate with the ACD system via a network termination or data bus of the ACD. More particularly, a typical ACD network has one or more network terminations that may be interconnected with peripheral devices or network termination functional modules using a well-defined bus protocol employed by the ACD network. The bus protocol may be either an industry-standard protocol or a proprietary protocol designed specifically for the particular ACD network. In any event, the network termination functional modules generally take the form of circuit cards that plug into the network terminations or ports of the ACD. Such circuit cards can provide, by way of example only, connections to twenty-four communication circuits each and/or provide functionality to the ACD network as described above.

As ACD's have come into increasingly widespread use, a sizeable number of third-party telecommunications companies have introduced a rich selection of ready-to-use circuit cards providing a wide range of functional features and services for ACD's. Because some ACD's employ a proprietary bus protocol for data and control signaling, however, those ACD's are not compatible with the bus protocols employed by many of the third-party manufacturer's circuit-card products (i.e., common, "off-the-shelf" circuit cards). In order to obtain the functional features offered by those third-party circuit cards, makers of some ACD's must expend substantial time and money to design and develop versions of such circuit cards that are compatible with their respective ACD bus protocols.

SUMMARY OF THE INVENTION

The present invention generally relates to a method and apparatus for providing an interface between a circuit that employs one bus protocol and an automatic call distribution network that employs another, different bus protocol.

In one embodiment of the present invention, an automatic call distribution system includes an automatic call distribution network and a plurality of network terminations that are interconnectable with the automatic call distribution network using a first bus protocol. An interface is interconnectable with one of the network terminations using the first bus protocol and is operable for interfacing between the first bus protocol and a second bus protocol different than the first bus protocol. A network termination functional module is interconnectable with the interface using the second bus protocol.

The interface may be further operable for interfacing between the first bus protocol and multiple different bus protocols different from the first bus protocol and may be alternatively interconnected with any desired network termination functional module using whatever bus protocol is employed by that network termination functional module.

Also, the automatic call distribution system may include a secondary automatic call distribution network with which at least one of the network terminations is interconnectable using the first bus protocol. In one embodiment, at any given time, the interface interconnects with either the automatic call distribution network or the secondary automatic call distribution network, but not both, via one of the network terminations, thereby enabling deselection of a non-operational automatic call distribution network, if necessary.

The network termination functional module may comprise a circuit card, and the interface may comprise a processor that provides for information exchange between the circuit card and the automatic call distribution network via the interface. Alternatively, the network termination functional module may comprise a plurality of circuit cards and the interface may comprise a processor for providing information exchange between the automatic call distribution system and one or more of the plurality of circuit cards.

In another embodiment of the invention, an automatic call distribution network interface is provided for use in an automatic call distribution system that includes an automatic call distribution network interconnectable with a plurality of network terminations using a first bus protocol. The interface includes a second bus interconnectable with a network termination functional module using a second bus protocol different than the first bus protocol and means coupled to the second bus and interconnectable with the first bus at one of the plurality of network terminations for converting between the first bus protocol and the second bus protocol.

In yet another embodiment of the present invention, a method of using an ACD network interconnectable with a plurality of network terminations using a first bus protocol includes the steps of providing a bus converter coupled with one of the network terminations using the first bus protocol and operable for converting between the first bus protocol and a second, different bus protocol and coupling a network termination functional module with the bus converter using the second bus protocol.

DESCRIPTION OF THE PREFERRED EMBODIMENTS

Figure 1:
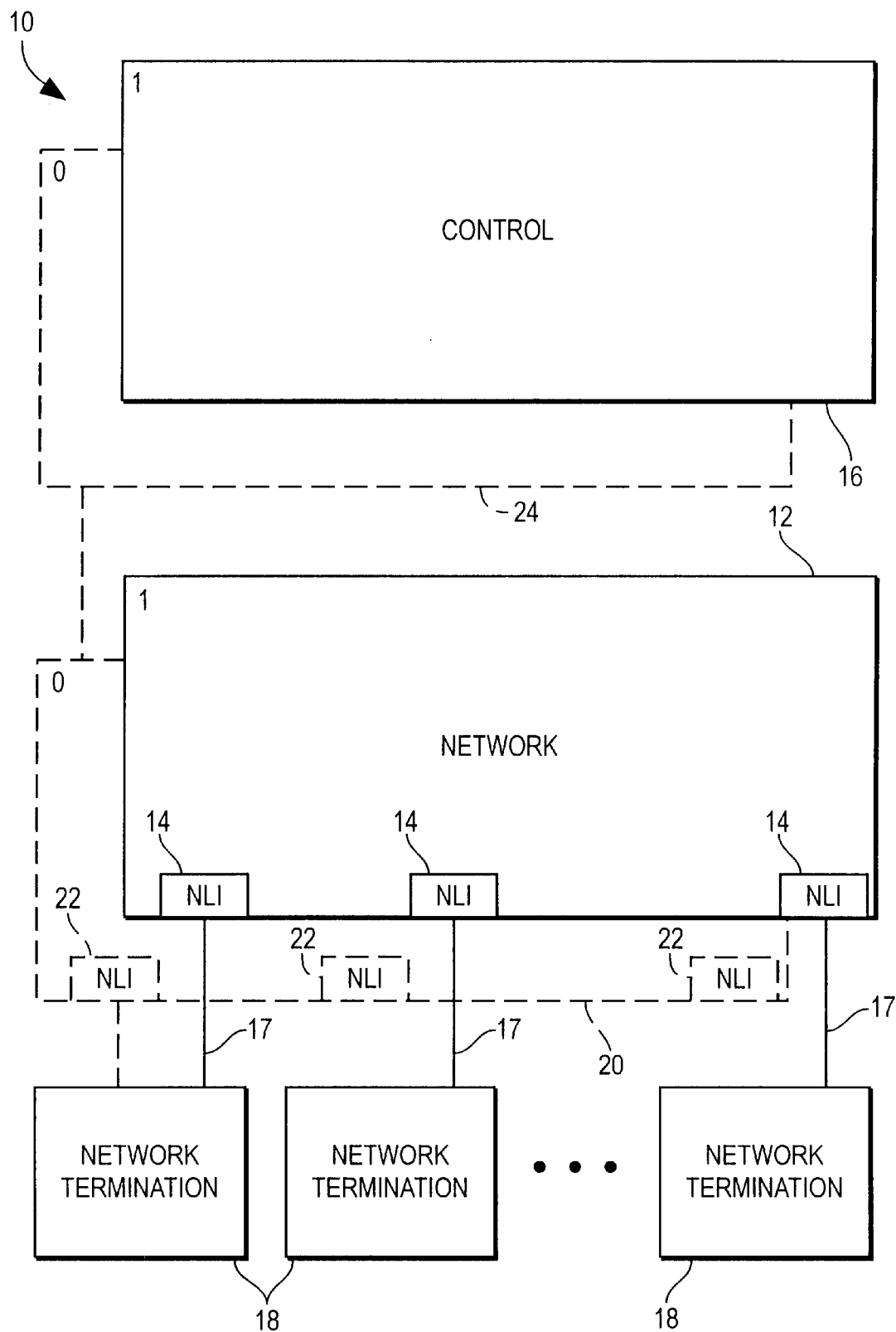
FIG. 1 is a high-level block diagram of one example of an automatic call distribution system in connection with which the apparatus and method of the present invention may be used.

FIG. 1 depicts an example of an automatic call distribution system 10 in connection with which the apparatus and method of the present invention may be used. As shown in FIG. 1, the automatic call distribution system 10 includes a network 12 having one or more network link interface (NLI) ports 14 and a control 16 coupled with the network 12 to implement control of the network 12. Coupled to each NLI port 14 via a corresponding serial bus 17 is a network termination 18. In operation of the illustrated automatic call distribution system 10, one or more peripheral devices or network termination functional modules (not shown in FIG. 1) may be interconnected with the network 12, each network termination functional module being coupled with a respective one of the network terminations 18. Alternatively, a network termination functional module may comprise not merely a single circuit card, but rather a plurality of circuit cards all coupled to a single network termination 18.

In some instances, it may be desirable to provide a secondary network 20 having NLI ports 22 and a secondary control 24 for controlling the secondary network 20. For example, a redundant secondary network 20 and control 24 may be coupled to the same network terminations 18 as are coupled to the network 12 to facilitate fault-tolerance in the automatic call distribution system 10. In other words, the operation of the secondary network 20 and control 24 would substantially mirror the operation of the network 12 and control 16, respectively, maintaining a duplicate set of the data and programming of the network 12 and control 16 such that in the event of a system failure in the network 12 and/or the control 16, the secondary network 20 and control 24 could be activated to fill the place of the failed system components.

The network termination functional modules provide additional or enhanced features, services, and connections to call trunks compared to what is provided by the ACD network itself. Indeed, commercially available peripheral devices or network termination functional modules provide a rich assortment of features and services for the automatic call distribution system 10. Some such commercially available network termination functional modules, however, employ bus protocols that are incompatible with the bus protocol employed by the network 12.

Figure 2:
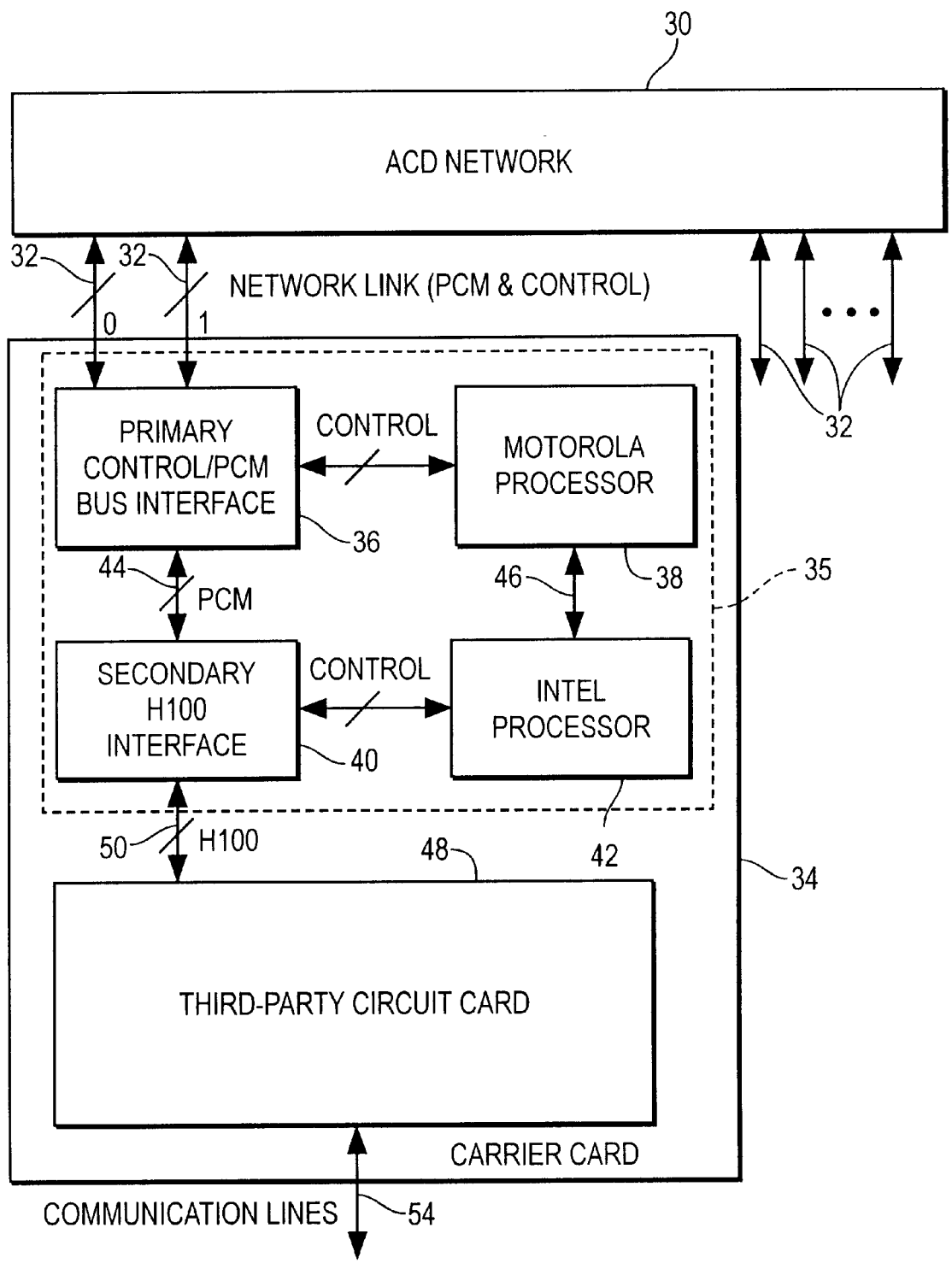
FIG. 2 is a block diagram of one embodiment of an interface apparatus according to the present invention.

In the illustrated embodiment, the present invention provides an interface between the bus protocol employed by the network 12 and the bus protocol employed by a network termination functional module that uses a bus protocol otherwise incompatible with or dissimilar to that of the network 12. FIG. 2 illustrates an example of an ACD network 30 to which one or more network termination functional modules may be coupled via respective four-wire serial buses (each represented by a bidirectional arrow 32 in FIG. 2). Each serial bus 32 comprises a differential pair of wires in each direction to enable bidirectional communication between the network 30 and the respective network termination functional module. The network 30 employs a first bus protocol (e.g., pulse-code modulation or PCM) for communication with network termination functional modules (e.g., single circuit cards or groups of circuit cards) which are coupled to the network 30 via these four-wire buses 32.

Coupled to the network 30 via one or more of the four-wire buses 32 is one embodiment of a network termination functional module according to the present invention, in the form of a carrier card 34 with an interface 35 thereon. In the embodiment of FIG. 2, the carrier card 34 is shown to be coupled to the network 30 at two four-wire buses 32 (labeled 0 and 1, respectively) to provide for fault-tolerance as described above. Depending on the number of auxiliary or secondary networks available in a given ACD system (such as the secondary network 20 of FIG. 1), the carrier card 34 could be coupled to the network 30 at more or fewer four-wire buses 32, as desired.

In the illustrated example of FIG. 2, the interface 35 of the carrier card 34 may include a primary interface 36 (e.g., a control/PCM bus interface), an associated processor 38 (e.g., a Motorola MC68xxx-class microprocessor) for controlling the primary interface 36, a secondary interface 40 (e.g., an H100 interface), and an associated processor 42 (e.g., an Intel Pentium-class microprocessor) for controlling and providing a suitable platform (e.g., Windows NT) for implementation of the secondary interface 40. In the illustrated embodiment, the primary interface 36 is coupled to the four-wire bus(es) 32 and is further coupled to the secondary interface 40 via a bidirectional PCM bus 44. A further bus 46 provides bidirectional control and data flow between the processor 38 and the processor 42 to facilitate conversion between the respective bus protocols of the primary interface 36 and the secondary interface 40.

The carrier card 34 also is adapted to receive a third-party circuit card 48 (such as a compact PCI or PCI Mezzanine Card (PMC), for example) or other network termination functional module, which employs a second bus protocol that need not be compatible with the first bus protocol of the network 30. The circuit card 48 is coupled to the secondary interface 40 using the second bus protocol (e.g., H100) via, in this example, an H100 bus 50. The circuit card 48 may simply provide functional features or services for the ACD network 30, or it may provide connections for coupling one or more communication lines 54 to the ACD network 30, or both. The circuit card 48 may be permanently or detachably mounted to, or simply positioned adjacent to, the carrier card 34 by any suitable means, and the interface 35 provides for bus conversion between the bus protocol employed by the ACD network 30 (PCM in the exemplary embodiment of FIG. 2) and the bus protocol employed by the third-party circuit card 48 (H100 in the exemplary embodiment of FIG. 2). As a result, seamless interaction takes place between the ACD network 30 and the third-party circuit card 48 without either being aware that communication between entities employing dissimilar bus protocols is taking place.

Of course, the apparatus and method of the present invention are not limited to the particular bus protocols described herein but may be applied to achieve bus compatibility between ACD networks and circuits employing any two dissimilar bus protocols. In fact, those of ordinary skill in the art will readily appreciate that a single interface 35 can be programmed to handle conversion between a first bus protocol employed by an ACD network 30 and a plurality of different bus protocols employed by a corresponding plurality of different circuit cards 48 or other network termination functional modules, such that the interface 35 would perform the required bus conversion for whatever particular circuit card 48 or other network termination functional module is coupled to the interface 35 at any given time.

Figure 3:
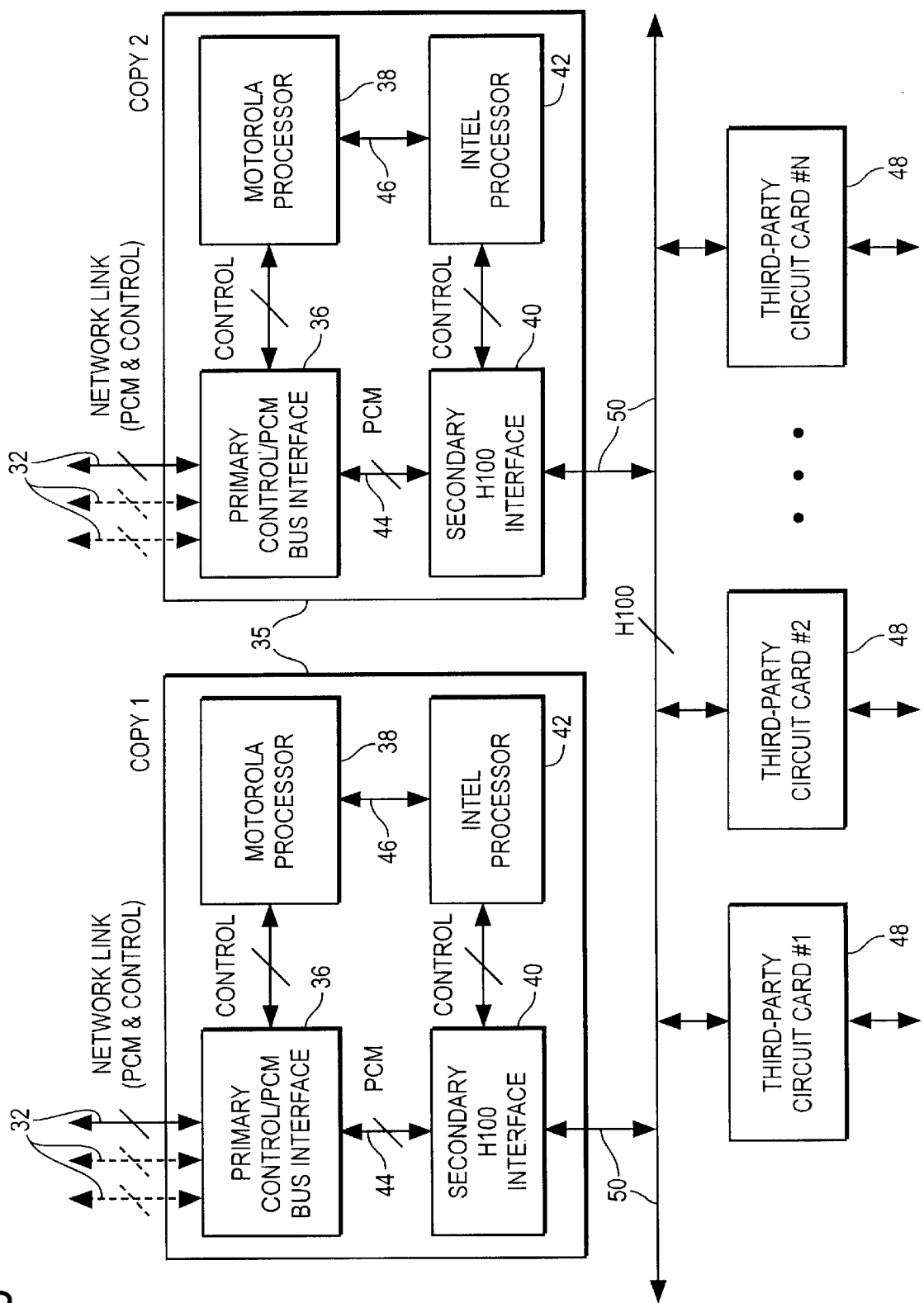
FIG. 3 is a block diagram of another embodiment of the apparatus and method of the present invention.

FIG. 3 illustrates another embodiment of apparatus according to the present invention. The embodiment of FIG. 3 includes a first interface 35 (just like the interface 35 shown in FIG. 2) identified as "COPY 1" as well as an optional second interface 35 identified as "COPY 2." The optional second interface 35 provides for fault-tolerance in the bus conversion between the network bus protocol and the circuit-card bus protocol. In other words, in the event that a fault or failure renders COPY 1 of the interface 35 inoperable, COPY 2 of the interface 35 can be activated to perform the bus conversion function no longer performed by inoperative COPY 1 of the interface 35. If necessary or desired, additional such redundant interfaces 35 may be provided, each having substantially the same structure and operation as the interfaces 35 shown in FIGS. 2 and 3. Because the interfaces 35 shown in FIG. 3 are identical to the interface 35 shown in FIG. 2, the foregoing description of the components of the interfaces 35 is not repeated here.

Whether a particular embodiment includes one interface 35 or a plurality of interfaces 35, an embodiment according to FIG. 3 may, for example, include not only one but a plurality of third-party circuit cards 48, all commonly coupled to the H100 bus 50. In such an embodiment, the third-party circuit cards 48 (identified as #1 through #N in FIG. 3) share the H100 bus 50 to communicate with the ACD network 30 (FIG. 2) in accordance with the H100 bus protocol, such that the network 30 can acquire the functional features, services, and/or communication connections of each of the plurality of third-party circuit cards 48 coupled to the H100 bus 50. Thus, a network termination functional module may comprise one or a plurality of third-party circuit cards 48. This alternative, multiple-circuit-card embodiment offers the additional advantage of distributing the marginal cost of adding the interface 35 to an ACD network 30 among the features and services provided by each of the third-party circuit cards 48 coupled to the ACD network 30 via the interface 35.

Figure 4:
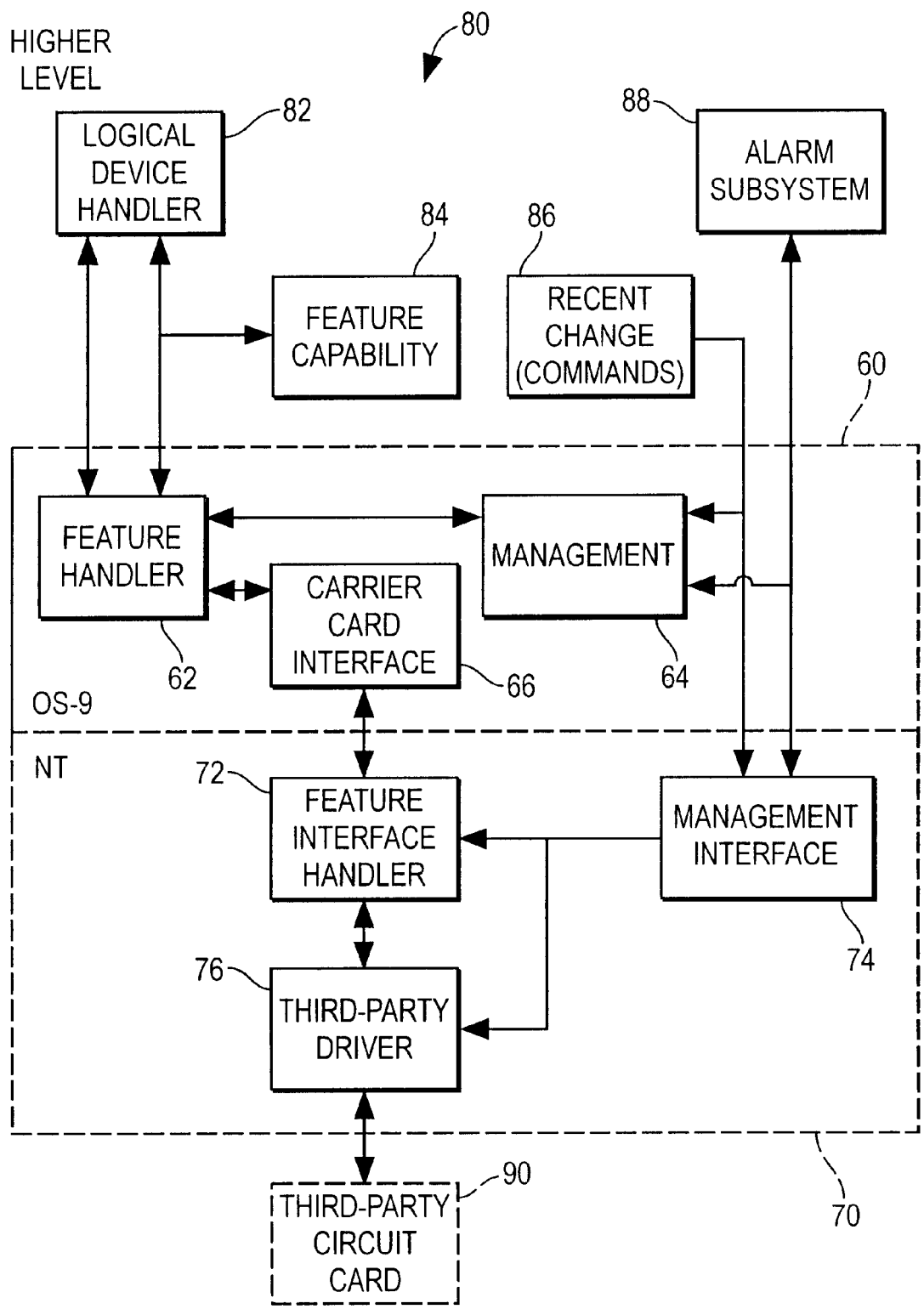
FIG. 4 is a functional block diagram illustrating exemplary software entities employed in one embodiment of an interface according to the present invention.

As shown in FIG. 4 the software entities employed in one embodiment of an interface according to the present invention include an OS-9 platform 60, comprising a feature handler (represented by a block 62 in FIG. 4), a management unit (represented by a block 64), and a carrier-card interface (represented by a block 66); and a Windows NT platform 70, comprising a feature handler (represented by a block 72), a management interface (represented by a block 74), and a third-party driver (represented by a block 76). Also shown in FIG. 4 are software entities employed at a higher level 80 (e.g., in the ACD network call-services module described below in connection with FIG. 5), which include a logical device handler (represented by a block 82), a feature capability module (represented by a block 84), a recent-change (commands) module (represented by a block 86), and an alarm subsystem (represented by a block 88). A third-party circuit card 90 is also shown in phantom lines in FIG. 4, for purposes of reference. The internal structure and operation of the third-party circuit card 90 form no part of the present invention, however, and are therefore not described herein.

Messages are sent to and received from the third-party circuit card 90 by the third-party driver 76, which handles all functions of the third-party circuit card 90 and serves as a conduit between the third-party circuit card 90 and the feature interface handler 72. The feature interface handler 72 includes suitable software specifically tailored to whatever particular third-party circuit card 90 is being used at any given time, for handling event conversion between the OS-9 platform 60 and the third-party circuit card 90, changing events signaled by the third-party circuit card 90 to a form usable by the ACD network 80.

On the OS-9 platform 60, the carrier-card interface 66 receives converted events from the feature interface handler 72 of the NT platform 70 and conveys those events to the OS-9 platform feature handler 62 for transfer to the logical device handler 82 of the ACD network 80. For events being sent from the ACD network 80 to the third-party circuit card 90, the NT feature interface handler 72 handles conversion of those events to the bus protocol used by the third-party interface card 90. Likewise, for events being sent from the third-party circuit card 90 to the ACD network 80, the feature interface handler 72 handles conversion of those events to the bus protocol used by the ACD network 80.

The management unit 64 and the management interface 74 handle the loading and running of software and the operating and updating of monitors used by the OS-9 platform 60 and the NT platform 70, respectively. The management unit 64 and the management interface 74 also receive input from the recent change (commands) module 86 of the ACD network 80, in the form of user commands or "recent changes" to be applied to the third-party circuit card 90 (e.g., to deactivate a particular telephone circuit, change a timing parameter, etc.). The management interface 74 also serves to notify the alarm subsystem 88 of the ACD network 80 of any malfunction that may occur in the third-party circuit card 90 or the interface 34 so that the ACD network 80 can be managed accordingly.

The logical device handler 82, together with its associated feature capability 84 comprise a control circuit which logically, rather than physically, handles all communication trunks coupled to the ACD network 80.

As illustrated by arrows interconnecting components in the block diagram of FIG. 4, the feature handler 62 communicates bidirectionally with the management unit 64 as well as with the carrier card interface 66. In addition, the feature handler 62 also communicates bidirectionally with the logical device handler 82 of the ACD network 80 and with a feature capability module 84 associated with the ACD network 80. The management unit 64 receives input from the recent change (commands) module 86 of the ACD network 80 and communicates bidirectionally with the alarm subsystem 88 of the ACD network 80 and with the management interface 74 of the NT platform 70.

Bidirectional communication channels are also provided between the carrier card interface 66 of the OS-9 platform 60 and the feature interface handler 72 of the NT platform 70, and between the feature interface handler 72 and the third-party driver 76 within the NT platform 70. The management interface 74 controls the operation of the feature interface handler 72 and the third-party driver 76. The third-party driver 76 communicates bidirectionally with the third-party circuit card 90 using the bus protocol thereof, and communication between the OS-9 platform 60 and the ACD network 80 employs the bus protocol of the ACD network 80.

Figure 5:
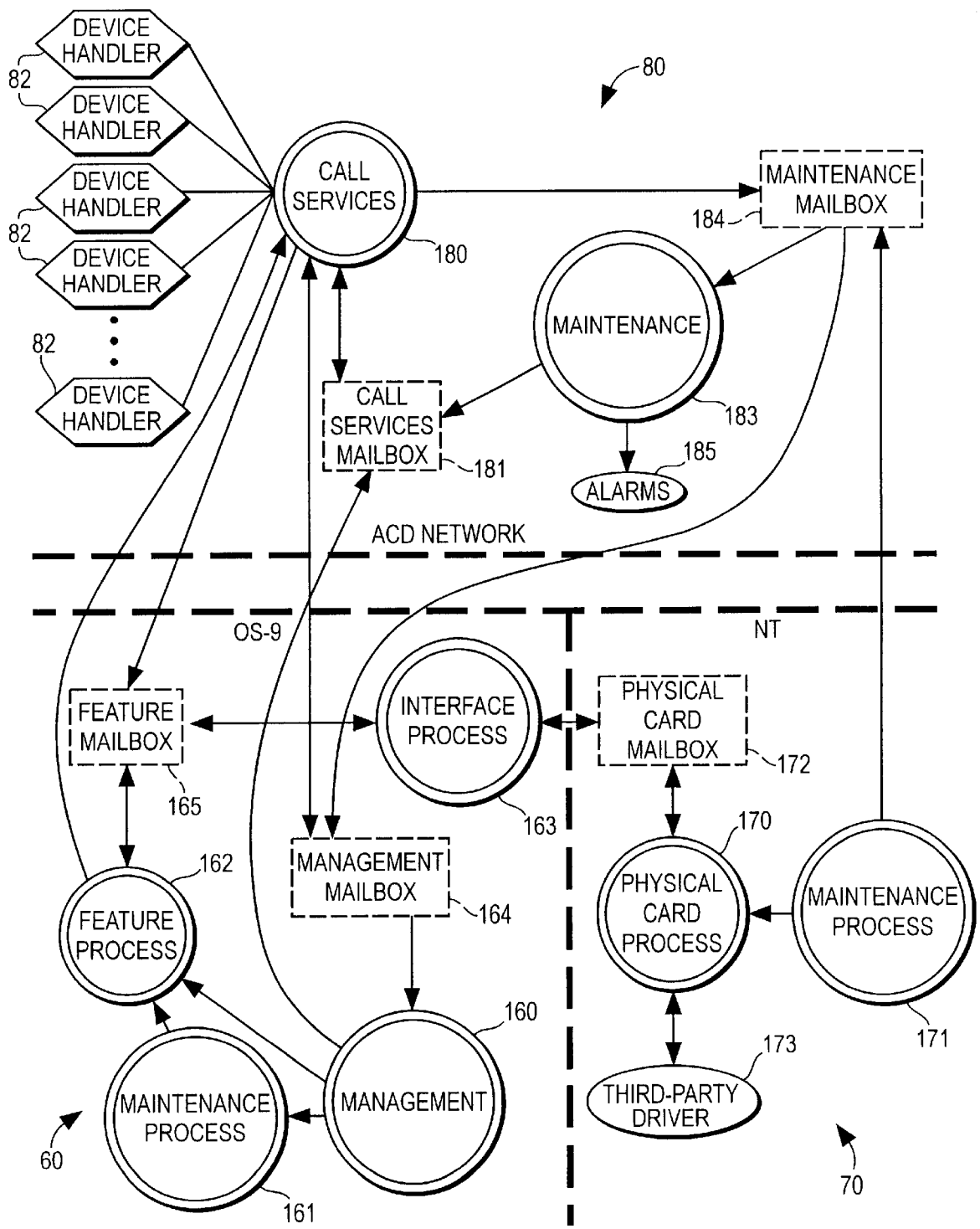
FIG. 5 is a block diagram illustrating components of one embodiment of an interface according to the present invention.

As shown in FIG. 5, the components of one embodiment of an interface according to the present invention are distributed among the OS-9 platform 60, the NT platform 70, and the ACD network 80. The OS-9 platform 60 includes a management process 160, a maintenance process 161, a feature process 162, an interface process 163, a management mailbox 164, and a feature mailbox 165. The NT platform 70 includes a physical card process 170, a maintenance process 171, a third-party driver 172, and a physical card mailbox 173. The ACD network 80 includes a call services process 180, a call services mailbox 181, one or more device handlers 182 operable through the call services process 180, a maintenance process 183, a maintenance mailbox 184, and an alarms process 185.

The arrows interconnecting the various components or software entities within each platform or components of different platforms in the embodiment shown in FIG. 5 represent channels for interaction (e.g., data flow and/or control) between or among those components, and the corresponding arrowheads indicate the direction(s) associated with such interaction. In general, messages are communicated among the various components or software entities via a system of mailboxes (e.g., management mailbox 164, feature mailbox 165, physical card mailbox 172, call services mailbox 181, and maintenance mailbox 184).

The call services process 180 comprises a computer program operating within a computer of the ACD network 80 and controls call processing within the ACD network 80 itself, as well as the device handler(s) 182 connected thereto. The feature handler 62 of the OS-9 platform 60 (FIG. 4) runs within the feature process 162 and sends and receives messages via the feature mailbox 165.

Figure 6:
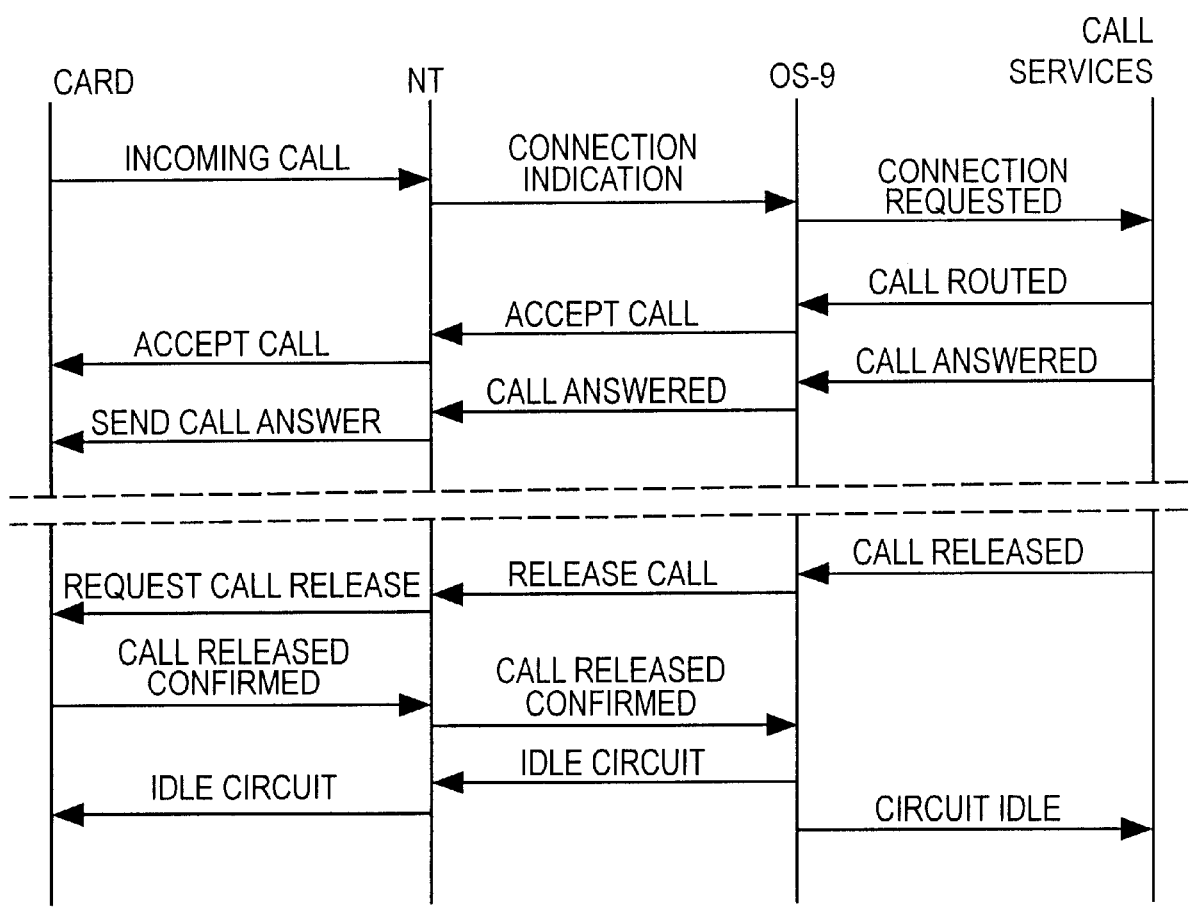
FIG. 6 is a diagram illustrating one example of call flow within an automatic call distribution system according to the present invention.

The call-flow diagram of FIG. 6 represents one example of a sequence of events that may occur within an ACD network 30, an interface 35, and a third-party circuit card 48, such as the one shown in FIG. 3 and illustrates the temporal relationships between those events. This example relates to an incoming telephone call that the third-party circuit card 48 receives from a first communication circuit (e.g., a telephone line) coupled to the third-party circuit card 48 for connection with a second communication circuit either on the ACD network 30 itself or on another network termination of the ACD network 30 in particular.

The process begins when an incoming telephone call is received by the third-party circuit card 48 from a call-initiating communication circuit coupled thereto. The third-party circuit card 48 seizes the communication circuit, and the secondary processor 42 sends a "connection" indication to the primary processor 38 which, in turn, requests a connection from the call services process 180 of the ACD network 80.

Within the ACD network, the call services process 180 routes the call to the circuit to which the call was directed and sends a "call-routed" message to the primary processor 38. The primary processor 38 sends an instruction to the secondary processor 42 to accept the call, and the secondary processor 42 sends an "accept-call" message to the third-party circuit card 48. Thereafter, the call is answered by a call-recipient circuit within or coupled to the ACD network 80, and the call services process 180 sends a "call-answered" message to the primary processor 38, which then sends a "call-answered" message to the secondary processor 42, which, in turn, sends a "send-call-answer" message to the third-party circuit card 48. The call then transpires between the call-initiating circuit coupled to the third-party circuit card and the call-recipient circuit within or coupled to the ACD network 80.

When the call is terminated by the call-recipient circuit, the ACD network 80 sends a "call-released" message to the primary processor 38, which sends a "release-call" message to the secondary processor 42, which sends a request to the third-party circuit card 48 to release the call. The third-party circuit card 48 interacts with the call-initiating circuit to obtain a call-release confirmation indicating that the call may be released and then sends a "call-release confirmation" message to the secondary processor 42. The secondary processor 42 then sends a "call-release confirmation" message to the primary processor 38, and the primary processor 38 begins an "idle circuit" procedure, which idles the connection established with the ACD network 80 and sends an "idle circuit" message to the secondary processor 42. The secondary processor 42 then idles the circuit established with the third-party circuit card 48, and call-processing for that call terminates.

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. An automatic call distribution system, comprising:
   an automatic call distribution network;
   a plurality of network terminations interconnectable with the automatic call distribution network using a first bus protocol;
   an interface interconnectable with one of the network terminations using the first bus protocol and operable for interfacing between the first bus protocol and a second bus protocol different than the first bus protocol; and
   a first network termination functional module interconnectable with the interface using the second bus protocol.

2. The automatic call distribution system of claim 1, wherein the interface is further operable for interfacing between the first bus protocol and a third bus protocol different than the first and second bus protocols and is alternatively interconnectable with a second network termination functional module different than the first network termination functional module using the third bus protocol.

3. The automatic call distribution system of claim 1, wherein the first network termination functional module comprises a circuit card.

4. The automatic call distribution system of claim 3, wherein the interface further includes a processor that provides for information exchange between the circuit card and the automatic call distribution network via the interface.

5. The automatic call distribution system of claim 1, wherein the first network termination functional module comprises a plurality of circuit cards, and wherein the interface includes a processor for providing information exchange between the interface and at least one of the plurality of circuit cards.

6. The automatic call distribution system of claim 1, further comprising a secondary automatic call distribution network with which at least one of the network terminations is interconnectable using the first bus protocol.

7. The automatic call distribution system of claim 6, wherein, at any given time, the interface interconnects with either the automatic call distribution network or the secondary automatic call distribution network, but not both, via one of the network terminations.

8. An automatic call distribution network interface for use in an automatic call distribution system including an automatic call distribution network interconnectable with a plurality of network terminations using a first bus protocol, the interface comprising:

a second bus interconnectable with a network termination functional module using a second bus protocol different than the first bus protocol; and converting means coupled to the second bus and interconnectable with the first bus at one of the plurality of network terminations for converting between the first bus protocol and the second bus protocol.

9. The automatic call distribution network interface of claim 8, wherein the converting means is further operable for alternatively converting between the first bus protocol and a third bus protocol different than the first and second bus protocols.

10. The automatic call distribution network interface of claim 8, wherein the network termination functional module comprises a circuit card.

11. The automatic call distribution network interface of claim 10, further comprising a processor that provides for information exchange between the circuit card and the automatic call distribution network via the automatic call distribution network interface.

12. The automatic call distribution network interface of claim 8, wherein the second bus is interconnectable with a network termination functional module comprising a plurality of circuit cards.

13. The automatic call distribution network interface of claim 12, further comprising a processor that provides for information exchange between the automatic call distribution network and at least one of the plurality of circuit cards via the automatic call distribution network interface.

14. A method of interfacing to an automatic call distribution network interconnectable with a plurality of network terminations using a first bus protocol, the method comprising the steps of:

coupling at least one bus converter to at least one of the network terminations such that at least one bus converter converts between the first bus protocol and a second bus protocol different than the first bus protocol; and coupling at least one network termination functional module to at least one bus converter using the second bus protocol.

15. The method of claim 14, wherein the bus converter is further operable for interfacing between the first bus protocol and a third bus protocol different than the first and second bus protocols and is alternatively interconnectable either with the first network termination functional module using the second bus protocol or with a second network termination functional module different than the first network termination functional module using the third bus protocol.

16. The method of claim 14, wherein the network termination functional module comprises a circuit card.

17. The method of claim 16, further comprising the step of providing the bus converter with a processor that performs information exchange between the circuit card and the automatic call distributor via the bus converter using the first and second bus protocols.

18. The method of claim 14, wherein the network termination functional module comprises a plurality of circuit cards and wherein the bus converter includes a processor for providing information exchange between the automatic call distributor and at least one of the plurality of circuit cards via the bus converter using the first and second bus protocols.

19. The method of claim 1, further comprising the steps of providing a secondary automatic call distribution network and providing for interconnection of at least one of the first network terminations with the secondary automatic call distribution network using the first bus protocol.

20. The method of claim 19, wherein, at any given time, the bus converter interconnects one of the first network terminations with either the automatic call distribution network or the secondary automatic call distribution network, but not both.

21. An automatic telephone call distribution system, comprising:

a telephone call switching network;

a plurality of network terminations interconnectable with the telephone call switching network using a first bus protocol;

an interface interconnectable with one of the network terminations using the first bus protocol and operable for interfacing between the first bus protocol and a second bus protocol different than the first bus protocol; and a first network termination functional module interconnectable with the interface using the second bus protocol.

22. The automatic telephone call distribution system of claim 21, wherein the interface is further operable for interfacing between the first bus protocol and a third bus protocol different than the first and second bus protocols and is alternatively interconnectable with a second network termination functional module different than the first network termination functional module using the third bus protocol.

23. The automatic telephone call distribution system of claim 21, wherein the first network termination functional module comprises a circuit card.

24. The automatic telephone call distribution system of claim 23, wherein the interface further includes a processor that provides for information exchange between the circuit card and the telephone call switching network via the interface.

25. The automatic telephone call distribution system of claim 21, wherein the first network termination functional module comprises a plurality of circuit cards, and wherein the interface includes a processor for providing information exchange between the interface and at least one of the plurality of circuit cards.

26. The automatic telephone call distribution system of claim 21, further comprising a secondary telephone call switching network with which at least one of the network terminations is interconnectable using the first bus protocol.

27. The automatic telephone call distribution system of claim 26, wherein, at any given time, the interface interconnects with either the telephone call switching network or the secondary telephone call switching network, but not both, via one of the network terminations.

* * * * *